United States Patent
Heider et al.

(10) Patent No.: US 12,318,864 B2
(45) Date of Patent: Jun. 3, 2025

(54) METHOD FOR MICROWELDING FLEXIBLE THIN FILMS, FOR EXAMPLE FOR USE IN ELECTRICAL AND ELECTRONIC DEVICES

(71) Applicant: Robert Bosch GmbH, Stuttgart (DE)

(72) Inventors: Andreas Heider, Stuttgart (DE); Axel Bormann, Bamberg (DE); Gerhard Kunz, Renningen (DE); Johannes Proell, Bamberg (DE); Lukas Alter, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 551 days.

(21) Appl. No.: 17/036,031

(22) Filed: Sep. 29, 2020

(65) Prior Publication Data
US 2021/0094125 A1  Apr. 1, 2021

(30) Foreign Application Priority Data
Sep. 30, 2019  (DE) ............ 102019215000.4

(51) Int. Cl.
| | |
|---|---|
| *B23K 26/00* | (2014.01) |
| *B23K 26/0622* | (2014.01) |
| *B23K 26/082* | (2014.01) |
| *B23K 26/12* | (2014.01) |
| *B23K 26/24* | (2014.01) |
| *B23K 26/60* | (2014.01) |
| *G06K 19/077* | (2006.01) |
| *B23K 101/42* | (2006.01) |
| *B23K 103/12* | (2006.01) |

(52) U.S. Cl.
CPC ......... *B23K 26/24* (2013.01); *B23K 26/0622* (2015.10); *B23K 26/082* (2015.10); *B23K 26/123* (2013.01); *B23K 26/60* (2015.10); *B23K 2101/42* (2018.08); *B23K 2103/12* (2018.08)

(58) Field of Classification Search
CPC .................. B23K 26/244; B23K 2103/50
See application file for complete search history.

(56) References Cited

U.S. PATENT DOCUMENTS

| | | | | |
|---|---|---|---|---|
| 4,224,096 | A * | 9/1980 | Osborne | B29C 65/1687 156/497 |
| 6,919,529 | B2 * | 7/2005 | Franzen | H01R 43/0221 219/121.64 |
| 2005/0242471 | A1 * | 11/2005 | Bhatt | B23K 26/0846 264/494 |
| 2007/0267009 | A1 * | 11/2007 | Wang | A61M 15/0028 128/200.23 |
| 2008/0149605 | A1 * | 6/2008 | Sykes | B23K 26/08 219/121.82 |

(Continued)

FOREIGN PATENT DOCUMENTS

| | | |
|---|---|---|
| CN | 101971351 A | 2/2011 |
| CN | 107186339 A | 9/2017 |

(Continued)

*Primary Examiner* — Ibrahime A Abraham
*Assistant Examiner* — Lawrence H Samuels
(74) *Attorney, Agent, or Firm* — Michael Best & Friedrich LLP (57) ABSTRACT

A method for welding a flexible film (10) to a carrier component (20) having the following steps:
1) pressing the film (10) on the carrier component (20) by a volumetric flow of a fluid, and
2) laser welding the film (10) on the carrier component (20).

21 Claims, 4 Drawing Sheets

(56) References Cited

U.S. PATENT DOCUMENTS

| | | | | |
|---|---|---|---|---|
| 2013/0026143 | A1* | 1/2013 | Samartsev | B23K 26/1462 |
| | | | | 219/121.64 |
| 2015/0021403 | A1* | 1/2015 | Finn | B23K 26/40 |
| | | | | 438/22 |
| 2015/0269472 | A1* | 9/2015 | Finn | H01Q 7/00 |
| | | | | 343/870 |
| 2016/0211500 | A1* | 7/2016 | Lee | H01M 50/536 |
| 2017/0095971 | A1* | 4/2017 | Pullini | B29C 65/70 |
| 2017/0282295 | A1* | 10/2017 | Tsukui | B23K 26/0676 |
| 2018/0045232 | A1* | 2/2018 | Capostagno | B23K 26/082 |
| 2018/0236605 | A1* | 8/2018 | Finuf | B23K 26/26 |
| 2018/0361516 | A1* | 12/2018 | Kobayashi | B23K 35/0238 |
| 2019/0001442 | A1* | 1/2019 | Unrath | B23K 26/703 |
| 2019/0217415 | A1* | 7/2019 | Rothwell | A24F 40/46 |
| 2019/0392283 | A1* | 12/2019 | Finn | G06K 19/0723 |

FOREIGN PATENT DOCUMENTS

| | | | | |
|---|---|---|---|---|
| DE | 2307096 | A1 | 8/1974 | |
| DE | 102017128398 | B3 | 5/2019 | |
| DE | 102018200544 | A1 | 7/2019 | |
| EP | 1920905 | A1 * | 5/2008 | B23K 26/0846 |
| EP | 2347852 | A1 * | 7/2011 | B23K 26/0006 |
| JP | 2009119465 | A | 6/2009 | |

* cited by examiner

METHOD FOR MICROWELDING FLEXIBLE THIN FILMS, FOR EXAMPLE FOR USE IN ELECTRICAL AND ELECTRONIC DEVICES

BACKGROUND

The invention relates to a method for welding a flexible film to a carrier component.

In the case of thin films, for example metallic films, for the process of joining them to a carrier component, for example likewise a metallic carrier component, the clamping technique is decisive for ensuring a technically zero gap. A technically zero gap is important because, with a gap, no heat transfer and no creation of a weld seam can take place and/or the films can be severed unwantedly.

SUMMARY

The invention provides a method for welding a flexible film to a carrier component. It goes without saying here that features and details that are described in connection with different claims of an embodiment of the invention also apply in connection with other claims of the same embodiment, and conversely in each case, so that reference is or can always be made from one to the other with respect to the disclosure in relation to the individual aspects of the invention.

The present invention relates to a method for welding (joining or integrally connecting) a flexible film to a carrier component, having the following steps:

1) pressing the film on the carrier component by a volumetric flow of a fluid, and
2) laser welding the film on the carrier component.

The method according to the invention can be used for welding flexible, thin films with a layer thickness in the micrometer range. In other words, the method according to the invention can be referred to as a microwelding method. A heat conduction welding or a welding process close to the deep welding threshold of the elements to be connected (films and carrier components) can preferably be used as laser welding within the context of the invention.

What is meant by pressing within the context of the invention is holding down the film on the carrier component by means of a contactless clamping technique to achieve a zero gap between the film and the carrier component, in particular in the region of a desired weld seam.

For pressing within the context of the invention, a volumetric flow of a pressurized fluid is used, preferably in the form of compressed air, nitrogen, shielding gas (Ar, He, $CO_2$, . . . ), etc.

A flexible film within the context of the invention can be taken as meaning a thin film of metal, for example copper, or plastic with a layer thickness in the micrometer range, in particular between 20 μm and 100 μm, preferably 35 μm. A flexible film within the context of the invention can be taken as meaning for example a flexible trace embedded within a flexible circuit board, known as a flexible-printed circuit or FPC for short.

A carrier component within the context of the invention can be taken as meaning a carrier component of metal, for example copper, or plastic with a layer thickness in the micrometer range, in particular between 50 μm and 500 μm, preferably between 50 μm and 140 μm, preferably 135 μm. A carrier component within the context of the invention can be taken as meaning for example an electrical carrier component, for example in the form of a landing, on a circuit board, for example a rigid circuit board, known as a printed-circuit board or PCB for short.

The invention provides a novel welding method for connecting thin films, for example metallic films, to carrier materials, for example likewise thin carrier materials. The concept of the invention here is that a volumetric flow of a fluid, preferably a pressurized fluid, is used to realize a contactless clamping technique for holding down the film on the carrier component. As a result, during subsequent welding, a low-loss heat transfer can be made possible between the film and the carrier component for creating a weld seam. Furthermore, the volumetric flow makes a technically almost zero gap possible. It is also ensured as a result that the film is not unwantedly severed, whether because of the gap and/or because of excessive laser irradiation. The proposed contactless clamping technique also eliminates or at least reduces the metal vapor disturbing the welding process.

The method according to the invention can be used in principle for the contacting of thin metallic traces with respect to electronic devices of all kinds. The method according to the invention can be used for example for the contacting of conductor bridges in microprinted components, such as for example in the construction of MEMS devices, for example by combining a laser-induced forward-transfer method (LIFT) with the microwelding method according to the invention. The method according to the invention can also be used in battery management systems (for example in lithium-ion batteries), specifically for contacting thin metallic flat conductors with respect to circuit boards (for example for a voltage tap, for example in the case of cell voltage monitoring). The method according to the invention can also be used for the contacting of thin current carrier films or plates with respect to terminals of battery cells (for example round cells, for example in lithium-ion batteries).

It is similarly conceivable to extend the method according to the invention to the attachment of nonmetallic films (for example of plastic) to metallic or nonmetallic carrier materials (for example for the packaging industry, medical technology, sensors, etc.) by means of the use of a laser radiation with a low beam quality (for example by means of a diode laser).

Furthermore, in the case of a method for welding a flexible film to a carrier component, the invention may provide that, in step 1), the fluid is used in the form of a pressurized fluid, preferably in the form of compressed air, nitrogen, shielding gas (Ar, He, $CO_2$, . . . ), etc. In this way, not only can the holding down of the film on the carrier component be realized, but also preparation made for the subsequent laser welding. It is also conceivable that the shielding gas may make the laser welding possible in the first place, or at least make it easier.

Furthermore, in the case of a method for welding a flexible film to a carrier component, the invention may provide that, in step 1), the volumetric flow is produced by a nozzle or a nozzle comb. By means of a nozzle, the volumetric flow can be accelerated, and consequently a suitable pressure for holding down the film on the carrier component can be set. By means of a nozzle comb, multiple films can be pressed on corresponding carrier components, for example on a circuit board, at the same time.

Furthermore, in the case of a method for welding a flexible film to a carrier component, the invention may provide that, in step 2), a laser radiation in the visible wavelength range, preferably in the green wavelength range (of about 490 nm-560 nm) and/or in the blue wavelength range (of about 380 nm-480 nm) or an NIR laser radiation is used. The laser radiation in the green wavelength range and to some extent in the blue wavelength range has proven to be advantageous for making possible a heat conduction welding of elements to be connected (films and carrier components) of copper, even untinned. An NIR laser radiation can make possible a welding process close to the deep welding threshold of the elements to be connected. This can make possible joining or connecting of the elements at the outer periphery of the weld seam.

Moreover, in the case of a method for welding a flexible film to a carrier component, the invention may provide that, in step 2), a pulsed laser radiation, a quasi CW laser radiation or a CW laser radiation is used. A pulsed laser radiation can provide a peak power output within the pulses. The pulsed laser radiation may be advantageous when using an NIR laser radiation in order to make sufficient bonding between the elements possible along the outer peripheries of the multiple weld spots, for example at isolated points. Apart from a narrow spectrum, a quasi CW laser radiation may make application of peak power outputs possible. A quasi CW laser radiation may be of advantage when using green and blue laser radiation. A CW laser radiation can make precise setting of the welding-in depth possible.

Furthermore, in the case of a method for welding a flexible film to a carrier component, the invention may provide that, in step 2), a 2D galvoscanner, a 1D/2D polygon scanner or a diode laser is used for producing a laser radiation. The 2D galvoscanner and the 1D/2D polygon scanner may be advantageous for creating the weld seam and also for examining or scanning. A diode laser may be advantageous for providing a laser radiation with a low beam quality, which may be advantageous for welding nonmetallic films (for example of plastic) to metallic or nonmetallic carrier components, for example in the packaging industry, medical technology or sensor technology.

Furthermore, in the case of a method for welding a flexible film to a carrier component, the invention may provide that, in step 2), a weld seam with an adjustable depth is created. The adjustable depth allows the method according to the invention to be flexibly adapted to films of different thicknesses. In some cases, the adjustable depth even makes it possible to dispense with an auxiliary coating, for example tinning, of elements to be connected. In particular, as a result, the heat conduction can be set such that the material of the carrier component is sufficiently heated up in the region of the desired weld seam to produce an integral connection to the film, without however damaging or even tearing off the film.

Furthermore, in the case of a method for welding a flexible film to a carrier component, the invention may provide that, in step 2), a heat conduction welding or a process close to a deep welding threshold for the carrier component is used. In this way, the method according to the invention can make possible a welding of thin metallic elements that is as reliable as possible and at the same time can treat gently the thin elements to be connected. Moreover, there is no splatter in heat conduction welding, which is advantageous in the case of electronic components.

Furthermore, in the case of a method for welding a flexible film to a carrier component, the invention may provide that, in step 2), a laser radiation, in particular a quasi CW laser radiation, with at least one of the following parameters is used:
 a wavelength of 500 nm-600 nm, in particular 515 nm,
 a focus diameter of 20 μm-1 mm, in particular 150 μm,
 a power output of 1 W-4000 W, in particular 200 W-600 W,
 a pulse duration of 0.3 ms-50 ms, in particular 2 ms-6 ms,
 a scanning rate of: 1 mm/s-1 km/s, in particular 200 mm/s-300 mm/s.

Traces are usually produced from copper. When using such a laser radiation, preferably green laser radiation, the degree of absorption in elements (films and carrier components) of copper increases by at least 35% in contrast with working copper with classic laser beam sources, for example in the near infrared range. The use of such a laser radiation consequently makes heat conduction welding of elements of copper possible, for example by means of a green quasi CW laser radiation, even without an auxiliary coating of tin. In this way, a microwelding according to the invention of thin elements of copper is therefore made possible.

Moreover, it is conceivable that, in step 2), a circular weld seam, preferably with a diameter of 0.1 mm-10 mm, in particular 0.1 mm-0.4 mm, or a linear weld seam is created. Furthermore, it is conceivable that, in step 2), a weld seam with a length of 0.1 mm-5 mm, in particular 0.5 mm, is created. Such a weld seam makes a gentle but also reliable attachment of the film to the carrier component possible.

Furthermore, in the case of a method for welding a flexible film to a carrier component, the invention may provide that, in step 2), a laser radiation, in particular a pulsed laser radiation, with at least one of the following parameters is used:
 a wavelength of 1030 nm-1064 nm,
 a focus diameter of 10 μm-500 μm, specifically 20 μm-200 μm,
 a power output of 1 W-2000 W, in particular 10 W-500 W, preferably 20 W-100 W,
 a frequency of 1 Hz-2000 kHz, in particular 1000 Hz-2000 Hz,
 a pulse duration of: 1 ns-500 ns, in particular 120 ns-500 ns,
 a scanning rate of: 1 mm/s-1 km/s, specifically 10 mm/s-1000 mm/s, specifically 10 mm/s-100 mm/s,
and/or that, in step 2), a linear weld seam or multiple linear weld seams, in particular parallel linear weld seams, is/are created,
and/or that, in step 2), a weld seam with a length of 0.1 mm-5 mm, in particular 0.4 mm, is created.

Using such a laser radiation, preferably NIR, for example pulsed, laser radiation, makes welding of elements of copper at the periphery of a weld seam possible.

Furthermore, in the case of a method for welding a flexible film to a carrier component, the invention may provide that, before step 1), a pre-deforming of the film, in particular in the form of a flexible trace embedded within a flexible circuit board, is performed. As a result, the holding down of the film on the carrier component for producing a zero gap between the film and the carrier component can be made easier. The sureness of placement and aiming accuracy when creating the weld seam are also improved as a result.

Furthermore, in the case of a method for welding a flexible film to a carrier component, the invention may provide that, after step 2), a testing, in particular optical testing, of a weld seam (N) for conductivity, resistance and/or impedance is performed, it being possible, in particular depending on the testing, for rewelding to be performed. In this way, the reject rate of a finished product can be significantly reduced.

Moreover, the invention may provide that the method is used for welding multiple flexible films to multiple carrier components in the same pass. Consequently, multiple functional components can be attached to corresponding carrier components, for example on a circuit board, at the same time.

It is also conceivable that the method is used for welding a flexible film of metal, in particular copper, or plastic to a carrier component of metal, in particular copper, or plastic. In this way, the field of use of the method according to the invention can be advantageously extended.

Within the scope of the invention, it is also conceivable that the method can be used for welding thin metallic traces to electrical carrier components, for example in the form of landings on circuit boards, in electronic devices, microprinted components, sensor devices, electrochemical energy converters, in particular batteries or fuel cells.

Advantageously, the method may be used for welding a flexible film in the form of a flexible trace embedded within a flexible circuit board to an electrical carrier component in the form of a landing on a rigid circuit board. In particular, the method may be used for welding a flexible film (10) of a layer thickness of 20 µm-100 µm, in particular 35 µm, to an electrical carrier component (20) of a thickness of 50 µm-500 µm, for example 50 µm-140 µm, in particular 135 µm.

The present invention provides furthermore the use of an energy system in a mobile environment, for example in a vehicle, or in a stationary environment, for example in a generator installation.

BRIEF DESCRIPTION OF THE DRAWINGS

The invention and developments thereof as well as advantages thereof are explained in more detail below on the basis of drawings, in which schematically.

DETAILED DESCRIPTION

In the various figures, the same parts of the invention are always provided with the same designations, for which reason they are generally only described once.

FIGS. 1 to 4 are intended to serve the purpose of illustrating a method according to the invention for welding a flexible film 10 to a carrier component 20.

FIGS. 1 to 4 show a basic construction for carrying out the method according to the invention.

FIGS. 1 to 4 show a possible film 10 within the context of the invention, which may be configured in the form of a flexible trace embedded within a flexible circuit board (flexible-printed circuit or FPC for short).

Figure 5:
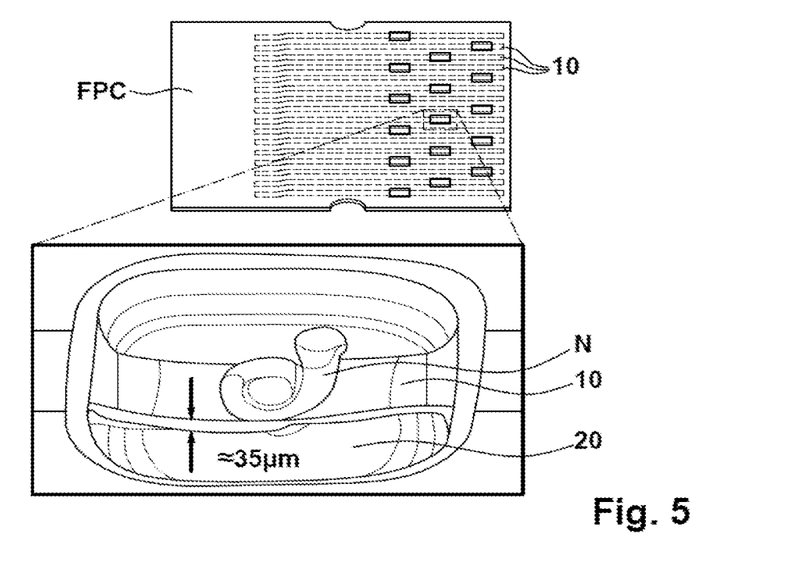
FIG. 5 shows a representation by way of example of an elastic film within the context of the invention.

FIG. 5 shows hereafter a flexible circuit board FPC with multiple embedded flexible traces as possible flexible films 10 within the context of the invention. In this case, each flexible trace may be formed from copper Cu and have a thickness or layer thickness of 20 µm-100 µm, in particular 35 µm. The surfaces of the recessed flexible traces may be configured in a chemically tinned or untinned manner. According to FIG. 5, the flexible circuit board FPC may have the following construction:

base film 25 µm, polyamide;
adhesive 28 µm;
signal layer 35/70 µm Cu, chem. Sn;
adhesive 60 µm;
top film 25 µm, polyamide.

Furthermore, FIGS. 1 to 4 show a possible carrier component 20 in the form of an electrical carrier component 20, in particular in the form of a landing on a rigid circuit board (printed-circuit board or PCB for short).

Figure 6:
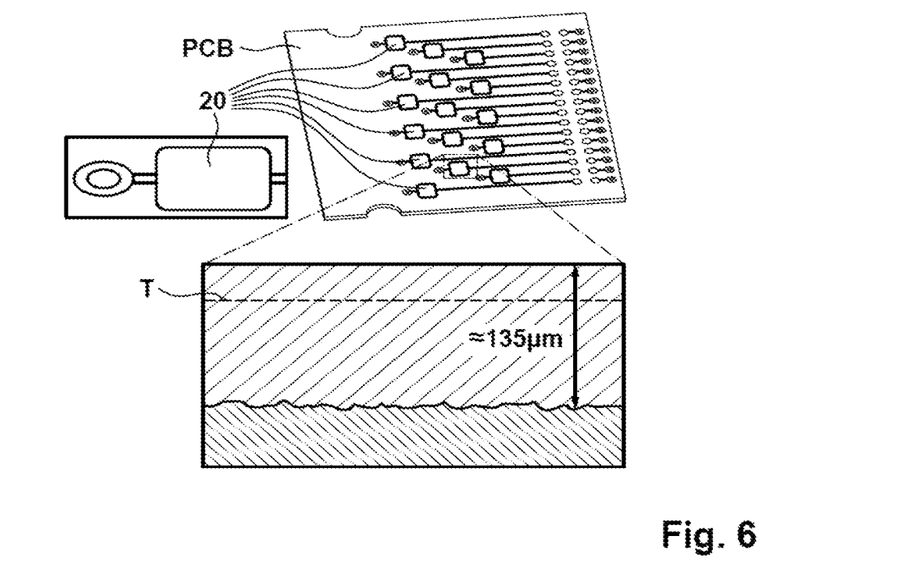
FIG. 6 shows a representation by way of example of a carrier component within the context of the invention.

FIG. 6 shows hereafter multiple electrical carrier components 20 in the form of multiple landings on a rigid circuit board PCB. The carrier components 20 (known as landings) may have thicknesses of 50 µm-500 µm, for example 50 µm-140 µm, in particular 135 µm. Of this, about 30 µm-120 µm may be attributable to the Cu base layer itself and about 20 µm respectively to an electrodeposited Cu layer (see the dashed separating line T given by way of example in the lower sectional representation of FIG. 6). The landing surface may be chemically tinned, but may also be configured in an untinned manner.

It is conceivable however that the method according to the invention can be used for the contacting of thin metallic traces with respect to electronic devices of all kinds, such as for example microprinted components, sensor devices, electrochemical energy converters, in particular batteries or fuel cells.

Figure 1:
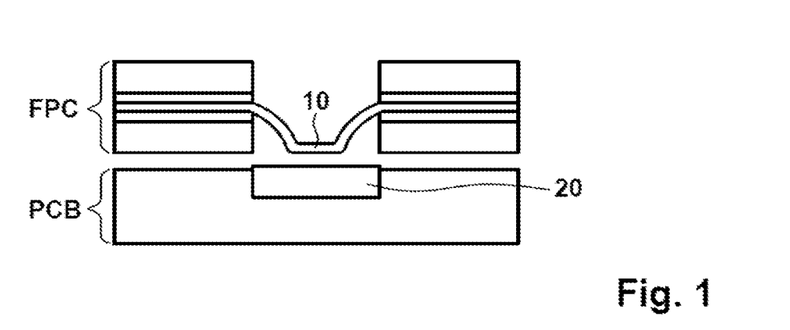
FIG. 1 shows a representation by way of example of the elements to be connected within the context of the invention.
Figure 2:
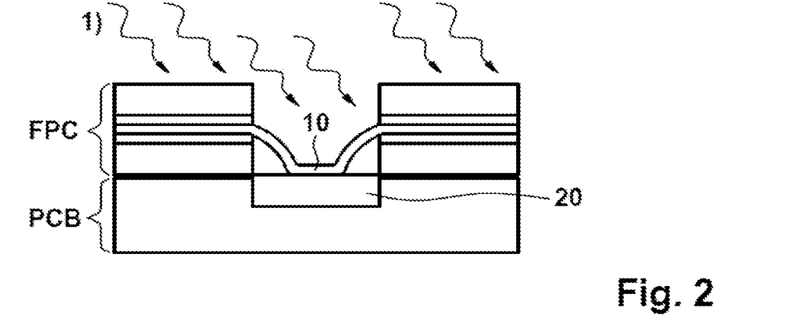
FIG. 2 shows a representation by way of example of a first method step within the context of the invention.

FIG. 2 shows the first step of the method according to the invention:

pressing the film 10 on the carrier component 20 by a volumetric flow of a fluid.

A pressurized fluid, preferably in the form of compressed air, nitrogen or shielding gas (Ar, He, $CO_2$, . . . ), etc. may be used here as the fluid.

Figure 3:
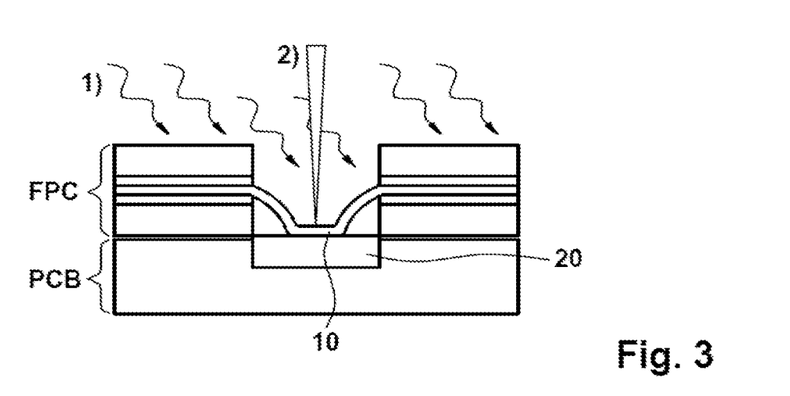
FIG. 3 shows a representation by way of example of a second method step within the context of the invention.

FIG. 3 shows the second step of the method according to the invention:

laser welding the film 10 on the carrier component 20.

A heat conduction welding or a welding process close to the deep welding threshold of the elements to be connected 10, 20 (films 10 and carrier components 20) may for example be used as laser welding within the context of the invention.

Figure 4:
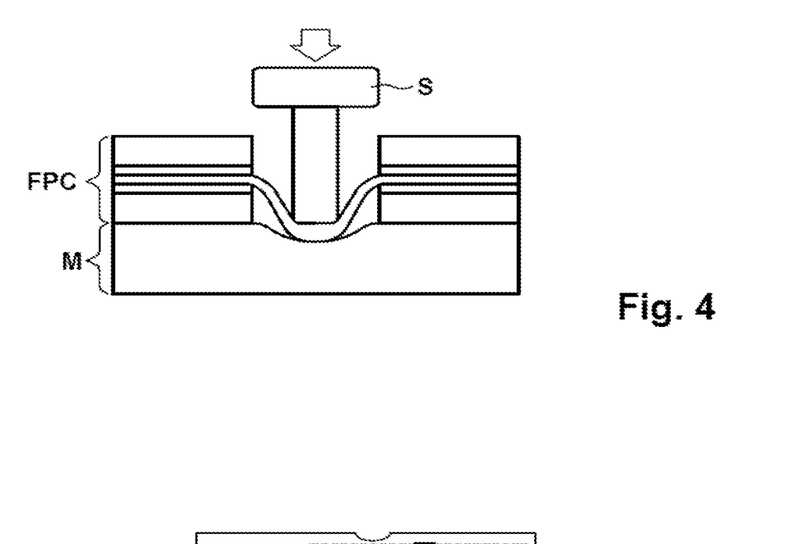
FIG. 4 shows a representation by way of example of an optional preparation method step within the context of the invention.

FIG. 4 also shows that, before step 1), a pre-deforming, in particular trench-shaped pre-deforming, of the film 10 can be carried out by an embossing punch S and a negative mold M for the deliberate overstretching of the film 10, for example by means of microdeforming and/or deep drawing.

Figure 7:
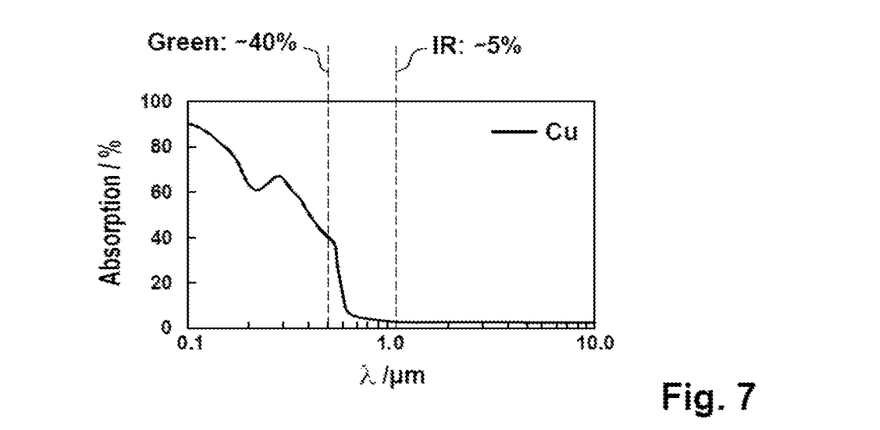
FIG. 7 shows an absorption diagram of a laser radiation for copper.

FIG. 7 shows by means of a diagram the absorption rate of laser radiation of different wavelengths in copper Cu, in particular for green laser radiation and for NIR laser radiation. It is evident from FIG. 7 that, by using green laser radiation, the degree of absorption in copper Cu increases by 35% in contrast with working copper Cu with classic laser beam sources in the near infrared range NIR. Therefore, the use of green laser radiation makes the microwelding of Cu connections possible.

The green laser radiation, in particular in the form of quasi CW laser radiation, that is used in step 2) of the method according to the invention may have at least one of the following parameters and/or properties:
- wavelength: 500 nm-600 nm, specifically 515 nm,
- focus diameter: 20 μm-1 mm, specifically 150 μm,
- focal position: z=0 mm to z=+/−2 zR, specifically z=+/−1 zR,
- power output: 1 W-4000 W, specifically 200 W-600 W,
- pulse duration: 0.3 ms-50 ms, specifically 2 ms-6 ms,
- pulse shape: rectangle, ramp(s),
- scanning rate: 1 mm/s-1 km/s, specifically 200 mm/s-300 mm/s,
- scanner equipment: 2D galvoscanner, 1D/2D polygon scanner,
- length of the weld seam: 0.1 mm-5 mm, specifically 0.5 mm,
- geometry of the weld seam: circle with a diameter of 0.1 mm-10 mm, specifically 0.1 mm-0.4 mm or line with a length of 0.1 mm-5 mm, specifically 0.5 mm.

Figure 8:
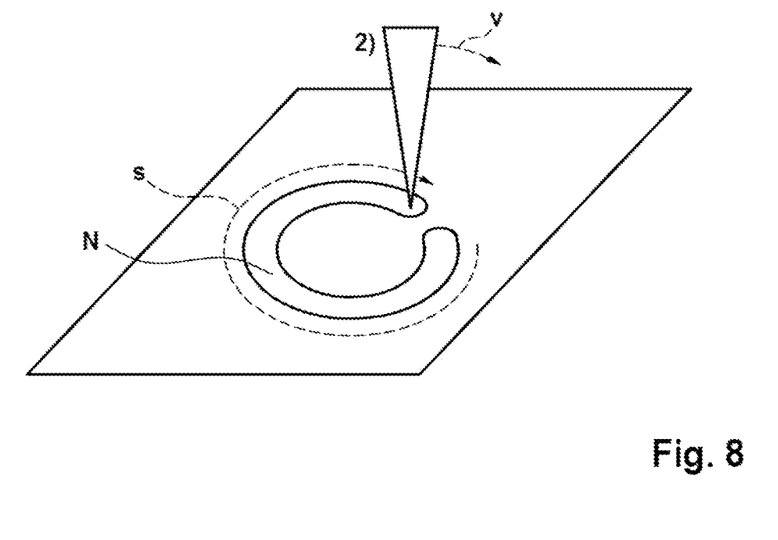
FIG. 8 shows an example of a weld seam within the context of the invention.

FIG. 8 shows a circular weld seam, which can be created by means of the green laser radiation, in particular in the form of quasi CW laser radiation. The welding process between the flexible circuit board FPC and a rigid circuit board PCB according to FIG. 8 may be carried out within one laser pulse. Within the scope of the invention, this laser pulse may have a duration of about 2 ms-5 ms. In this time, the laser beam in the form of a circle or in the form of lines is passed over the surface of the flexible circuit board FPC on a rigid circuit board PCB (known as long pulse welding or quasi CW welding). Consequently, annular or linear microwelded seams with a seam length s are created during a pulse. The depth of the weld seam can be advantageously controlled by what is known as the energy input per unit length L (quotient of laser power output & traversing speed).

$$L = \frac{\text{power output } P}{\text{speed } v} \left[\frac{Ws}{m} = \frac{J}{m}\right]$$

In a certain process regime (dependent on Cu/Sn layer thicknesses of the flexible circuit boards FPCs and the rigid circuit boards PCBs), with a constant working speed and laser focus area, the welding-in-depth increases with increasing laser power output, without the elements 10, 20 that are to be connected being damaged.

Figure 9:
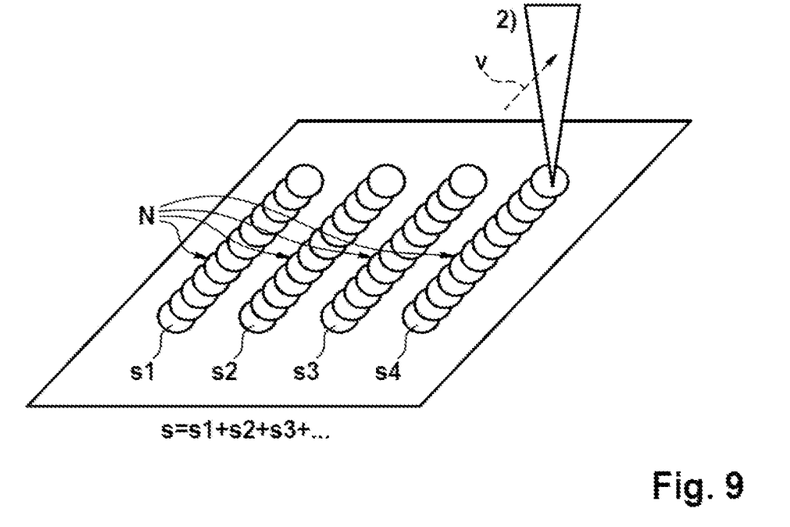
FIG. 9 shows a further example of a weld seam within the context of the invention.

FIG. 9 shows multiple linear weld seams which can be created by means of the NIR laser radiation, in particular in the form of pulsed laser radiation. By using pulsed NIR laser radiation, energy/heat can be deposited in the material in spite of a low degree of absorption, since the pulsed NIR laser radiation has a small focus diameter and the resultant high intensity causes a deep welding effect. By the use of pulsed NIR laser radiation, the microwelding within the context of the invention of Cu connections therefore likewise becomes possible.

The NIR laser radiation, in particular in the form of pulsed laser radiation, that is used in step 2) of the method according to the invention may have at least one of the following parameters and/or properties:
- laser focus diameter 10 μm-500 μm, specifically 20 μm-200 μm,
- wavelength: 1030 nm-1064 nm;
- power output: 1 W-2000 W, specifically 10 W-500 W, specifically 20 W-100 W;
- rep. rate: 1 Hz-2000 kHz, specifically 1000 Hz-2000 Hz;
- pulse duration: 1 ns-500 ns, specifically 120 ns-500 ns;
- geometry: lines (0.4 mm length, 100 μm hatch, others conceivable);
- scanning rate: 1 mm/s-1 km/s, specifically 10 mm/s-1000 mm/s, specifically 10 mm/s-100 mm/s;
- scanner equipment: 2D galvanoscanner, 1D/2D polygon scanner.

The welding process between the flexible circuit board FPC and a rigid circuit board PCB according to FIG. 9 can be carried out by means of a multiplicity of laser pulses. A single laser pulse may in this case have a typical duration of about 120 ns (possibly longer pulses of up to 500 ns are conceivable). Within the welding time, the laser beam in the form of lines is passed over the surface of the flexible circuit board FPC on a rigid circuit board PCB. Consequently, multiple linear microwelded seams with the seam length s, consisting of a multiplicity of pulses, are created. The heat input into the material that is required for the welding process may be controlled by what is known as heat accumulation of individual laser pulses, whereby an average heating ΔT is obtained.

$$\Delta T = (1-R) \cdot \frac{2 \cdot I_0}{\lambda} \cdot v_{rep} \cdot \tau \cdot \sqrt{\alpha \cdot t} \cdot \text{ierfc}\left(\frac{z}{\sqrt{4 \cdot \alpha \cdot t}}\right)$$

$$i. \boxed{\frac{1}{\sqrt{\pi}} \text{ for } z = 0}$$

In the center of the laser beam, the material is vaporized, along the lateral surface of the deposition there forms the weld seam. Tin Sn can thereby melt, and in thin marginal zones so can copper Cu.

In addition, it is conceivable that the method according to the invention can be extended to the attachment of nonmetallic films (for example of plastic) to metallic or nonmetallic carrier materials (for example for the packaging industry, medical technology, sensors, etc.) by means of the use of a laser radiation with a low beam quality (for example by means of a diode laser).

The above description of the figures describes the present invention exclusively by way of examples. It goes without saying that it is possible for individual features of the embodiments to be freely combined with one another, where technically expedient, without departing from the scope of the invention.

What is claimed is:

1. A method for welding a flexible film (10) to a carrier component (20), having the following steps:
   1) Pressing the film (10) on the carrier component (20) by a volumetric flow of a fluid, and
   2) laser welding the film (10) on the carrier component (20),
      wherein before step 1), a pre-deforming of the film (10) is performed using a method that does not include the volumetric flow of fluid and is done by means of a negative mold (M), and
      wherein the method is used for welding a flexible film (10) in the form of a flexible trace embedded within a flexible circuit board (FPC) to an electrical carrier component (20) in the form of landing on a rigid circuit board (PCB).

2. The method according to claim 1, wherein, in step 1), the fluid is a pressurized fluid, and/or wherein, in step 1), the volumetric flow is produced by a nozzle or a nozzle comb.

3. The method according to claim 2, wherein the pressurized fluid is in the form of compressed air, nitrogen and/or shielding gas.

4. The method according to claim 1, wherein, in step 2), a laser radiation in the visible wavelength range, or an NIR laser radiation is used, and/or wherein, in step 2), a pulsed laser radiation, a quasi CW laser radiation or a CW laser radiation is used.

5. The method according to claim 4, wherein the laser in the visible wavelength range is in the green wavelength range and/or in the blue wavelength range.

6. The method according to claim 1, wherein, in step 2), a laser radiation with at least one of the following parameters is used:
 a wavelength of 500 nm-600 nm,
 a focus diameter of 20 μm-1 mm,
 a power output of 1 W-4000 W,
 a pulse duration of 0.3 ms-50 ms,
 a scanning rate of 1 mm/s-1 km/s.

7. The method according to claim 6, wherein the laser radiation is a quasi CW laser radiation, with at least one of the following parameters:
 a wavelength of 515 nm,
 a focus diameter of 150 μm,
 a power output of 1 200 W-600 W,
 a pulse duration of 2 ms-6 ms,
 a scanning rate of 200 mm/s-300 mm/s.

8. The method according to claim 1, wherein, in step 2), a laser radiation with at least one of the following parameters is used:
 a wavelength of 1030 nm-1064 nm,
 a focus diameter of 10 μm-500 μm,
 a power output of 1 W-2000 W,
 a frequency of 1 Hz-2000 kHz,
 a pulse duration of: 1 ns-500 ns,
 a scanning rate of: 1 mm/s-1 km/s.

9. The method according to claim 8, wherein the laser radiation is a pulsed laser radiation, with at least one of the following parameters:
 a wavelength of 1030 nm-1064 nm,
 a focus diameter of 20 μm-200 μm,
 a power output of 10 W-500 W,
 a frequency of 1000 Hz-2000 Hz,
 a pulse duration of: 120 ns-500 ns,
 a scanning rate of: 10 mm/s-1000 mm/s.

10. The method according to claim 9, wherein the laser radiation is a pulsed laser radiation, with at least one of the following parameters:
 a power output of 20 W-100 W
 a scanning rate of: 10 mm/s-100 mm/s.

11. The method according to claim 8, wherein the laser radiation is a pulsed laser radiation.

12. The method according to claim 1, wherein, after step 2), a testing of a weld seam (N) for conductivity, resistance and/or impedance is performed.

13. The method according to claim 1, wherein the method is used for welding multiple flexible films (10) to multiple carrier components (20) in the same pass.

14. The method according to claim 1, wherein the method is used for welding a flexible film (10) of a layer thickness of 20 μm-100 μm, to an electrical carrier component (20) of a thickness of 50 μm-500 μm.

15. The method according to claim 14, wherein the method is used for welding a flexible film (10) of a layer thickness of 35 μm, to an electrical carrier component (20) of a thickness of 50 μm-140 μm.

16. The method according to claim 15, wherein the method is used for welding a flexible film (10) of a layer thickness of 35 μm, to an electrical carrier component (20) of a thickness of 135 μm.

17. The method according to claim 1, wherein the metal is copper.

18. The method according to claim 1, wherein the pre-deforming of the film (10) includes using a punch(S).

19. The method according to claim 18, wherein the punch(S) is an embossing punch(S) that cooperates with the negative mold (M).

20. The method according to claim 1, wherein the pre-deforming of the film (10) includes deep drawing the film (10).

21. The method according to claim 1, wherein the pre-deforming of the film (10) includes microdeforming the film (10).

\* \* \* \* \*